United States Patent [19]
Rowe

[11] Patent Number: 5,295,760
[45] Date of Patent: Mar. 22, 1994

[54] TESTABLE BULKHEAD

[76] Inventor: John W. Rowe, P.O. Box 601, Berry Creek, Calif. 95916

[21] Appl. No.: 96,983

[22] Filed: Jul. 27, 1993

[51] Int. Cl.$^5$ .......................... B65G 5/00; B65B 3/06
[52] U.S. Cl. .................................. 405/52; 137/236.1;
141/86; 285/192; 405/154; 405/128
[58] Field of Search .......... 405/154, 157, 184, 52–59;
285/133.1, 138, 192, 236; 141/86; 137/236.1

[56] References Cited

U.S. PATENT DOCUMENTS

| | | | |
|---|---|---|---|
| 2,896,669 | 7/1959 | Broadway et al. | 405/154 X |
| 4,659,251 | 4/1987 | Petter et al. | 405/52 |
| 4,844,657 | 7/1989 | Ripley et al. | 405/154 |
| 4,890,863 | 1/1990 | Westhoff et al. | 285/192 X |
| 4,958,957 | 9/1990 | Berg et al. | 405/53 X |
| 4,971,477 | 11/1990 | Webb et al. | 137/236.1 X |
| 5,114,271 | 5/1992 | Sunderhaus et al. | 141/86 X |
| 5,117,877 | 6/1992 | Sharp | 405/52 X |
| 5,129,684 | 7/1992 | Lawrence et al. | 285/192 X |
| 5,135,324 | 8/1992 | Bravo | 137/236.1 X |

Primary Examiner—Dennis L. Taylor

[57] ABSTRACT

A leak testable bulkhead around a pipe penetrating through a wall, comprising a cylindrical hollow insert for partial passage through a hole in the wall, and through which the pipe passes. The insert has a perpendicular abutment flange preventing complete passage through the hole. Also provided are two rubbery gaskets for sealing, placed on each side of the hole against the wall with the flange abutting one gasket, and a wide-lipped washer against the other gasket. A nut threadably engaged on the insert and placed against the washer secures the insert, gaskets and washer tightly in place. Also included are two flexible reducer boots, a smaller of which is sealingly affixed over an unthreaded end of the insert adjacent the nut and reduces downward and sealingly affixes around the pipe passing through the insert. A larger of the reducers sealingly affixes onto the washer, and reduces downward and sealingly affixes over the pipe slightly beyond the smaller reducer so as to encase the nut and smaller reducer. Connected air passages and chambers are defined in communication with the inner sides of each sealed area. An air input valve on the larger exposed reducer boot allows pressurizing of the passages and chambers so that the ability of the sealed points to retain air pressure may be tested and monitored with a pressure gage.

3 Claims, 4 Drawing Sheets

TESTABLE BULKHEAD

BACKGROUND OF THE INVENTION

1. Field of the Invention

This invention relates to entrance seals for preventing the transference of fluids around elongated members such as pipes at penetration points through walls. The present bulkhead or penetration seal, which I refer to as a testable bulkhead, may be pressure tested at the initial installation or at any time thereafter to ascertain the integrity of the seal.

2. Description of the Prior Art

The most relevant sealed bulkheads or penetration seals appear to be found in the prior art pertaining to chemical storage and particularly fuel storage and piped fuel distribution systems such as are commonly found at gas or service stations. The majority of underground fuel tanks have a manhole which is accessible from the ground surface through a manhole cover. Fuel lines, as well as electrical conduits typically pass through the wall of the manhole for the purpose of connecting equipment within the manhole to equipment outside of the manhole. Since the manhole and pipes are located underground, there is always the risk of ground water leaking into the manhole around the pipes at the penetration points. Leakage of water into the manhole is undesirable since it could damage equipment such as fuel leak sensors and pumps within the manhole. Leakage of fuel out of the pipeline and the manhole at the wall junction is also not desired for environmental reasons. In modern installations, to avoid fuel leakage from the pipeline, a secondary containment system is used around the primary fuel pipe(s). If a leak occurs in the primary pipe, the fuel is directed by gravity back through a secondary containment pipe into the manhole, where the manhole serves as an emergency reservoir, and where electronic sensors and alarms register the malfunction. However, there is still the possibility that the fuel could accumulate sufficiently within the manhole to reach the junction of the pipe wall penetration, and therefore measures must be taken to contain the accumulated fuel since leakage into the surrounding soil is environmentally unsound and against government regulations.

Various techniques have been used to seal around pipes passing through the wall of the manhole, including welding of the pipes to the chamber wall, and using flanged fittings and sealing gaskets bolted to the wall. Rigidly welding the fuel line or entrance fitting to the chamber wall is not an ideal arrangement since ground shifting often occurs which could rupture the weld or pipe. Simple gasket seals have often failed in the past, with the seals often previously being in an undetectable weakened state for some time prior to the failure. Simple gasket seals, as well as welded connections do not allow for testing of the integrity of the seal at the time of installation or at periodic intervals after installation, and so the sealing connection may be defective at the time of the initial installation.

Therefore, there is a need for a penetration seal which can be tested to determine the integrity of the seal, and for a testable seal that also allows shifting or angling of the pipe at the point of penetration through a wall, and there is no similarly structured prior art which teaches such an arrangement as does the present invention.

SUMMARY

The present invention provides a seal or leak testable bulkhead around an elongated member penetrating through a partition or wall, and may be utilized around any elongated item such as a pipe or conduit passing through a wall where a fluid tight seal around the elongated member is desired. The present bulkhead generally comprises a cylindrical hollow insert for partial passage through a hole in the wall, and through which the pipe passes. The insert includes a perpendicular abutment flange preventing complete passage of the insert through a properly sized hole in the wall. Also provided are two rubbery compressible gaskets for sealing, with one gasket placed on each side of the hole against the wall. The first gasket is placed between the wall and the flange of the insert, and the second gasket is placed on the opposite side of the wall. The flange also serves to press the one gasket against the wall to form a seal. A washer having a wide outer surface or lip is placed against the second gasket. A hexagonal nut is threadably engaged on a threaded portion of the insert and tightened against the washer to secure the insert, gaskets and washer tightly in place in the hole through the wall. Also included are two flexible reducer boots, a smaller of which is sealingly affixed over an unthreaded shoulder portion of the insert adjacent the nut. The smaller reducer boot reduces downward and sealingly affixes around the pipe passing through the center of the insert. A larger of the reducer boots sealingly affixes onto the wide exposed surface of the washer, and reduces downward and sealingly affixes around the pipe slightly beyond the terminal end of the smaller reducer so as to encase the nut and smaller reducer. Connected air passages and chambers are defined in communication with the inner sides of each sealed area of the bulkhead. An air input valve on the larger exposed reducer boot allows pressurizing of the passages and chambers so that the ability of the sealed points to properly retain air pressure may be monitored with a pressure gage. The ability of the pressured areas to maintain a given pressure indicates the passage of fluids and gasses around the seal cannot occur, and that the bulkhead is functioning as intended. The testing of the seals may be at the initial installation, and may occur periodically as part of an extended monitoring and maintenance program.

The internal bore of the insert through which the pipe passes is sized sufficiently large, and the reducer boots are sufficiently flexible so as to allow for the pipe to enter the wall as a slight angle if necessary, since during initial installation, it is often unfeasible to make the pipe enter the wall at a perfect 90 degree angle. Additionally, by sizing the insert large relative to the pipe, and making the boots flexible, shifting of the pipe during an earthquake or ground settling is allowed. The insert being maintained short in length also aids in accommodating an angled entrance of the pipe or shifting of the pipe after installation.

One significant advantage of the present testable bulkhead is that an interior chamber is created between the assembled components which allows the chamber to be pressurized to determine the effectiveness of all the sealed joints. If there is any leakage in any of the sealed joints, then a reduction in pressure will show on a pressure gauge applied to the in-put valve. It is important to note that the pressurized air extends past the hex nut, and around the edge of the washer and through the hole in the manhole wall. By allowing the chamber to extend to all these sealed joints, leakage can be detected entering and exiting the seal. If, for example, the pressurized chamber were instead to extend only to one gasket, a leak could conceivably occur around the flange of the insert and the other gasket and enter the opposite side of the wall with the air chamber still indicating a complete effective seal. It is therefore important, especially concerning chemical and fuel storage tanks, that the air chamber extend to all sealed joints to detect leaks both entering and exiting the wall aperture to which the testable bulkhead is affixed, and the present invention provides those features.

DESCRIPTION OF THE PREFERRED EMBODIMENTS

Figure 1:
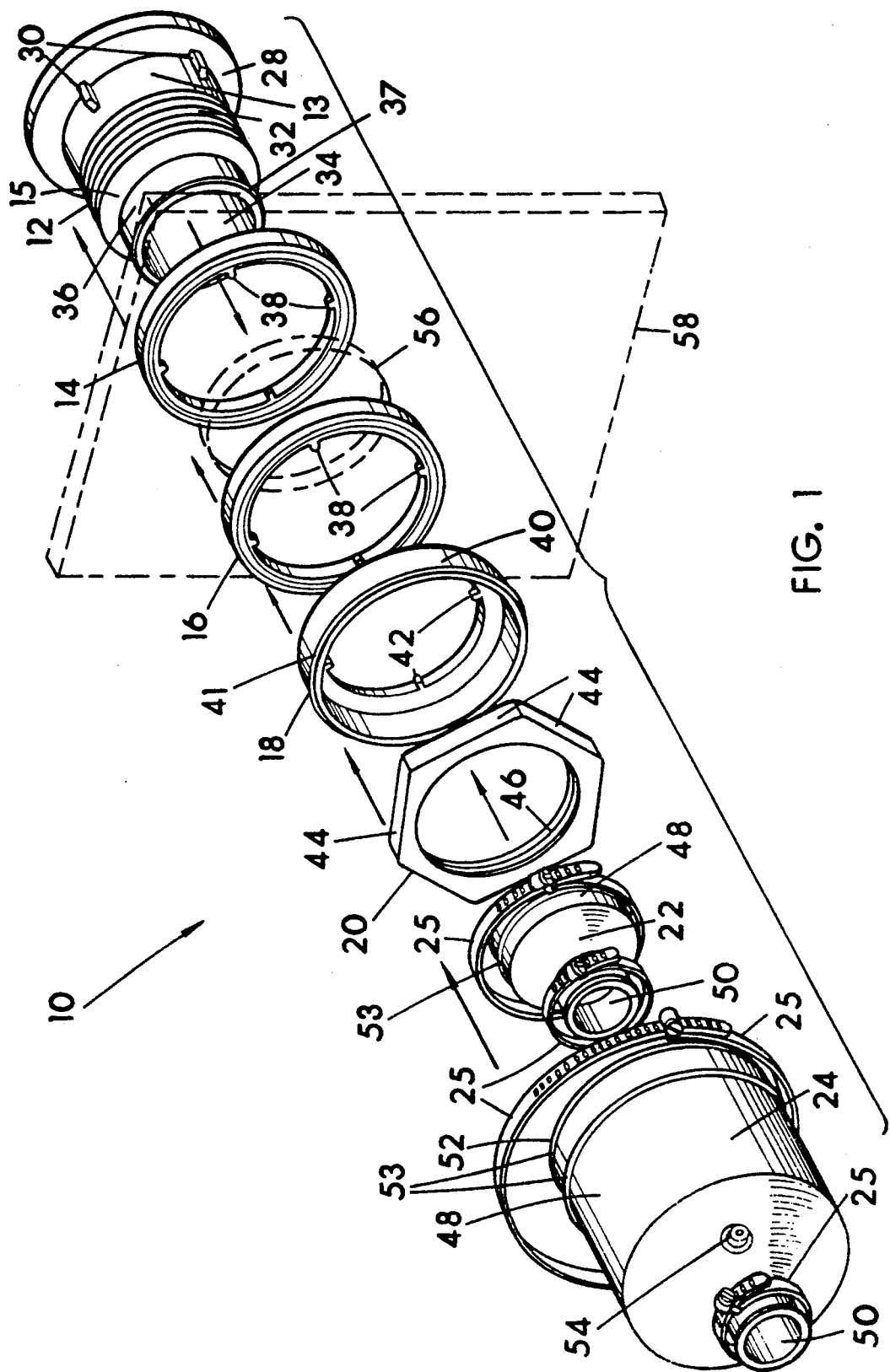
FIG. 1 is an exploded perspective view of the component parts of a preferred embodiment of the present invention.
Figure 2:
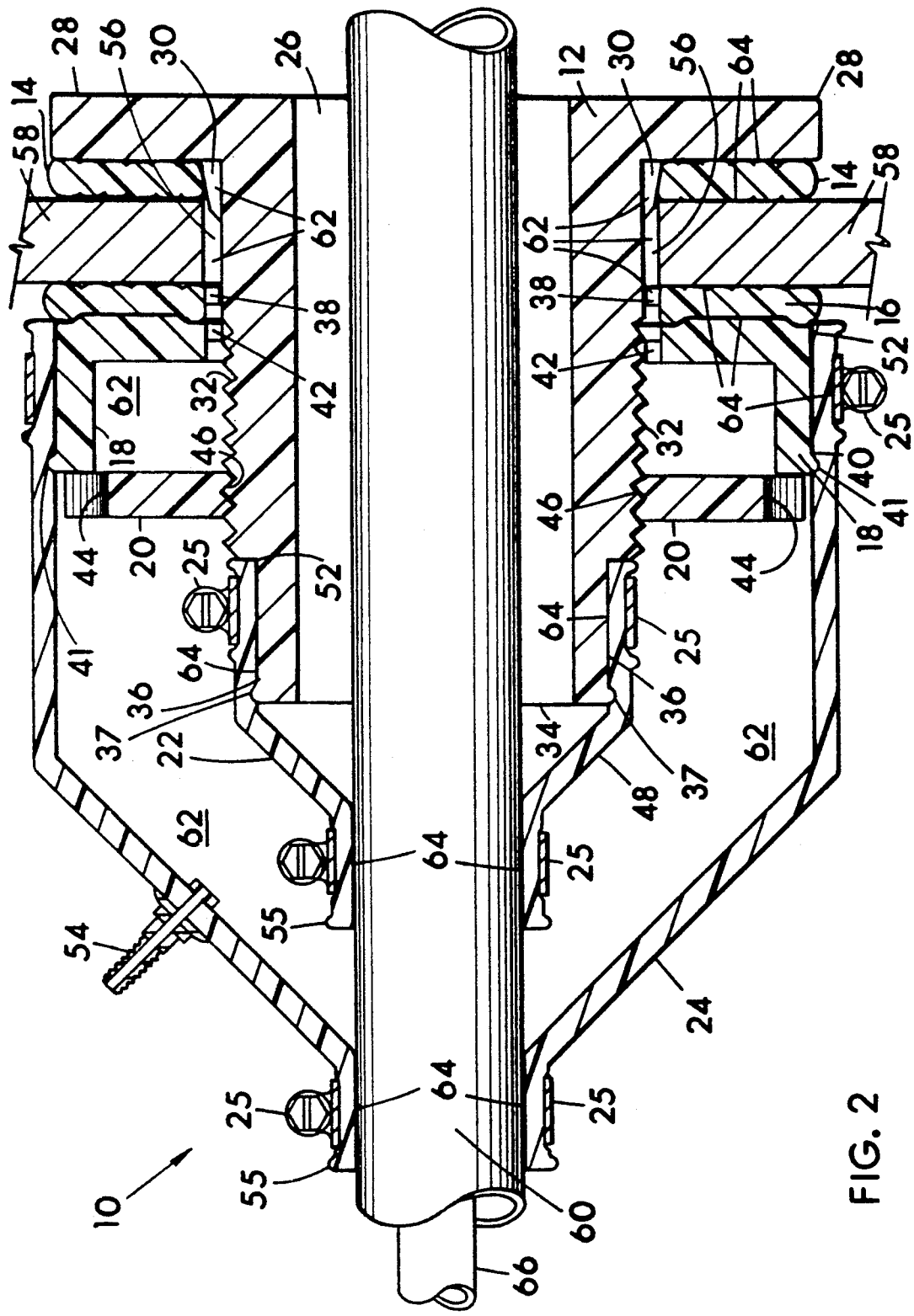
FIG. 2 is a cross sectioned side view of the preferred embodiment affixed over a pipe penetrating a wall.
Figure 3:
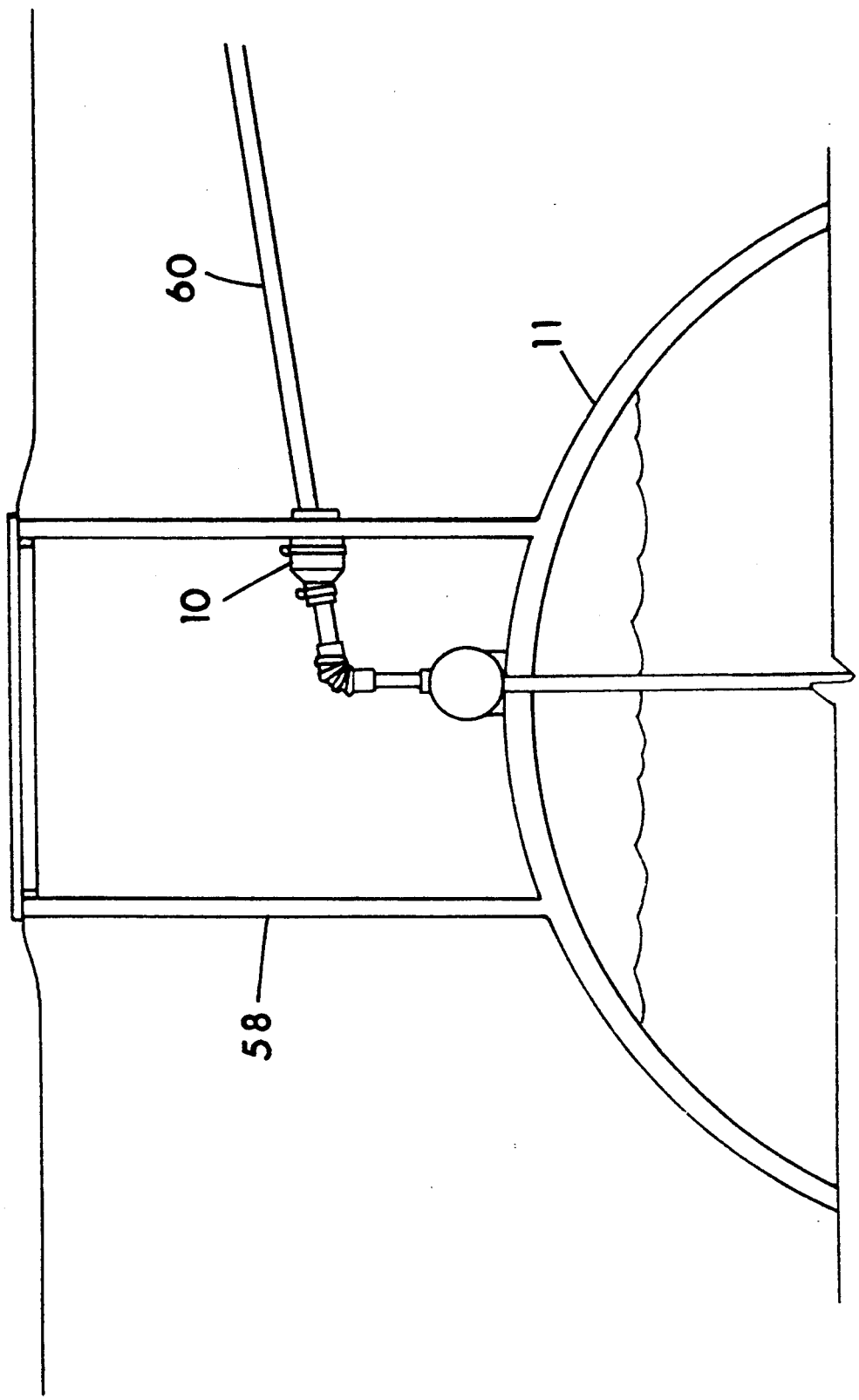
FIG. 3 is an illustrative view of the preferred embodiment used on the manhole of an underground fuel storage tank, and affixed over a pipe at the junction of a wall penetration.

Referring now to the drawing FIGS. 1 and 2 where a preferred embodiment of testable bulk 10 is illustrated, and to FIG. 3 where the preferred embodiment is illustrated in association with an underground fuel tank 11 such as those used in service stations. Testable bulkhead 10 generally comprises male insert 12, gaskets 14 and 16, wide-lipped washer 18, hexagonal nut 20, flexible reducer boots 22 and 24, and adjustable ring clamps 25. The component parts 12, 18, and 20 are all preferably manufactured of a suitably strong and rigid plastics material which is corrosion resistant and not adversely effected by petroleum products, water or extremes in temperature. The component parts 12, 18, and 20 could also be made of metals. The component parts 14, 16, 22, and 24 are preferably manufactured of suitably strong, flexible and resilient rubbery materials which are corrosion resistant and not adversely effected by petroleum products, water or extremes in temperature. The component parts 12, 14, 16, 18, 22, and 24 must additionally be made of materials which are impervious to the passage of fluids and gasses, since at one location or another these components are required to be sealed. Liquids and gaseous materials will henceforth be referred to as fluids.

The adjustable diameter ring clamps 25, commonly referred to as hose clamps, are preferably made of corrosion resistant metal, although plastic clamps if suitably structured would also serve the purpose.

The approximate sizes of the component parts of testable bulk 10 relative to one another should be ascertainable from drawing FIGS. 1 and 2.

Male insert 12 is a rigid elongated hollow cylinder having a center bore and two opened ends 26 and 34 oppositely disposed from one another at each end of the bore. The first open end 26 is rimmed with a rigid right angled shoulder or abutment flange 28 which is sufficiently large relative to a properly sized hole in a wall so as to prevent insert 12 from being able to be fully passed through the hole. Flange 28 is considered to be at the rear end of insert 12. Affixed equidistance from one another at the exterior junction of flange 28 and the exterior of annular wall 13 of insert 12, are four centering guides 30 each having a sloped surface positioned to wedge or guide insert 12 into the center of a properly sized hole through a wall. Centering guides 30 help center insert 12 in a hole in a wall, and additionally help assure an air passageway to gasket 14 from the front end of insert 12 by maintaining the wall 58 away from annular wall 13 of insert 12 as may be ascertained from FIG. 2 and will be appreciated with continued reading. The larger exterior diameter of the cylindrical barrel portion of insert 12, designated annular wall 13 in FIG. 1, possesses exterior threads 32 in spaced relationship from flange 28 so as to leave an unthreaded portion between the terminal end of the threads 32 and flange 28, forward of flange 28. Adjacent to threads 32, opposite to first open end 26, is the second open end 34 of the insert 12. The exterior diameter of insert 12 adjacent to second open end 34 is smaller than that of the annular wall 13, and forms a smooth shoulder 36 defined by an annular wall having a smaller diameter than annular wall 13. A perpendicular edge 15 serves as a transitional wall stepdown between the larger diameter annular wall 13 and shoulder 36 as shown in FIG. 1. The internal bore through insert 12, from open end 26 to open end 34, may be of a single internal diameter, and of course must be large enough to accommodate the passage of any pipe intended to be inserted through the bore. Affixed on shoulder 36, at the front or forward most end of insert 12, is an extending annular lip 37 which serves to help prevent boot 22 from slipping from shoulder 36 as will be appreciated with continued reading.

Gaskets 14 and 16 are identical in structure to one another, and are each generally comprised of a flat annular resilient plastic ring having a circular interior opening which is sized slightly larger than the exterior diameter of annular wall 13. Located equidistance from one another on the edge of the interior opening of each gasket 14 and 16, are four centering guides 38 comprising small rounded knobs. Centering guides 38 serve to support gaskets 14 and 16 away from the exterior surface of insert 12, and thereby define air passageways as shown in FIG. 2. The flat sides of gaskets 14 and 16 may posses several rounded concentric grooves or rings which when compressed, flatten out and provide a more effective seal. Gaskets 14 and 16 are in effect O-rings intended to serve as compressible fluid seals. The wide flat side surfaces of the gaskets 14 and 16 are intended to provide greater surface area contact and thus improved sealing capabilities.

Washer 18 generally comprises a rigid, substantially flat annular ring having a short annular right angled side wall 40 which has been previously referred to as a wide-lip. Side wall 40 is positioned to define the major diameter of the washer 18. The forward most exterior edge of side wall 40 has an extending annular lip 41 much the same as lip 37 on insert 12. Lip 41 serves to help prevent boot 24 from slipping from side wall 40 as will be appreciated with continued reading. There is a central interior opening through washer 18, the edge of which is affixed with four centering guides 42 similar to centering guides 38. Washer 18 is sized for insertion over the exterior of annular wall 13 of insert 12 and to abut gasket 16 with the ring-like side wall of the washer 18 as shown in FIG. 2. Centering guides 42 serve to support washer 18 off the exterior surface of insert 12, and thereby define air passageways from the open side of washer 18 adjacent nut 20 to gasket 16 as may be ascertained from FIGS. 1 and 2 where the components of the preferred embodiment are in relative proper placement for assembly in FIG. 1 or assembled in FIG. 2.

Hexagonal nut 20 generally comprises a rigid narrow ring having six flat outer side surfaces 44 and a central opening affixed with interior threads 46 sized for engagement with exterior threads 32 on insert 12. The major exterior diameter of nut 20 relative to washer 18 is such that the points or corners of nut 20 across its major diameter abut the forward most edge of side wall 40 adjacent lip 41 of washer 18, and the flat surfaces 44 between the points or corners of nut 20 provide a space for the passage of air above the flat surfaces 44 and into the open center of washer 18. Nut 20 is essentially a large conventional nut having the outer hexagonal shape to allow the manipulating of the nut, i.e. tightening and loosening with a tool such as an adjustable wrench or the like.

The first or smaller reducer boot 22 is primarily structured as a hollow open ended cylindrical funnel having a larger diameter annular side wall 48 which bevels inward towards a smaller diameter annular side wall or neck 50 at the forward most end of the boot 22. The open end of boot 22 opposite to neck 50 is designated as larger open end 52. On the exterior surface of boot 22 adjacent larger open end 52 are two extending annular lips 53 which serve primarily as alignment guides for an adjustable clamp 25.

The second or larger reducer boot 24 is structured similar to boot 22 except that the sidewall 48 is a much larger diameter and is also longitudinally longer. However, neck 50 of boot 24 is the same size as its counterpart on boot 22 as may be seen in FIG. 2. Boot 24 also contains a larger open end 52. On the exterior surface of boot 24 adjacent larger open end 52 are two extending annular lips 53 which serve primarily as alignment guides for a clamp 25 (same as boot 22). Boot 24 is also affixed, on the beveled section of side wall 48, with an air inlet valve 54, commonly referred to as a schrader valve, being of the type which incudes a depressible valve stem and is self-closing with a spring biased valve. Valve 54 is structured and arranged to allow the in-putting and exhausting of air from one side of wall 48 to the other as will be appreciated with continued reading.

To secure necks 50 and large open ends 52 of both reducers 22 and 24 in position, adjustable clamps 25 are used. Clamps 25 are similar to conventional hose clamps which can be tightened over the exterior of boots 22 and 24 sufficiently to create an air tight seal.

The forward most end of the neck 50 of each of the boots 22 and 24 also preferably include an extending annular lip 55 (FIG. 2) to help prevent the neck 50 from ever being drawn out from underneath a clamp 25.

To assemble and utilize the component parts of testable bulkhead 10, a hole 56 is first made in a wall 58 of a sufficient size for insertion of the cylindrical barrel portion of insert 12. Opening 56 should be just large enough to allow at least the partial insertion of centering guides 30 into the opening 56 as shown in FIG. 2. Wall 58 can include almost any generally planar structure such as a wall or panel in an enclosed container or even an interior or exterior wall within a building. The thickness of wall 58 however, cannot be such that threads 32 on insert 12 are completely obstructed when insert 12 is positioned within aperture 56. Wall 58 may be slightly curved such as is often the case with the wall defining a manhole, provided the curvature is not too great. The thickness and pliability of gaskets 16 and 18 aid in rendering a seal on a slightly curved wall. I have consider making flange 28 as well as other components of bulkhead 10 curved to fit excessively curved walls. For the purpose of this disclosure, wall 58 shall be described as having an interior and an exterior side. Although not always the case, testable bulkhead 10 is generally positioned on the interior side of wall 58 if wall 58 is the wall defining a manhole as shown in FIG. 3, as this allows access to the boots 22 and 24 and most other components of the bulkhead 10 at a later date from within the manhole. This also allows for the periodic pressure testing of the bulkhead 10 if desired, as the exterior side of the wall 58 would be covered with dirt.

After a properly sized hole 56 is made in wall 58, gasket 14 is first inserted over the exterior of insert 12 and positioned adjacent flange 28. The second open end 34 of insert 12 is then inserted into aperture 56 from the exterior side of wall 58. Since aperture 56 will generally be slightly larger than the exterior diameter of insert 12, centering guides 30 of insert 12 will guide the insert centrally within aperture 56. Gasket 14 is abutted against the exterior side of wall 58. A free end of a pipe 60 may now be inserted through insert 12, and the free end is left free and accessible for the assemblage of the remaining parts of bulkhead 10. Pipe 60 shown in FIG. 2 is a secondary containment pipe, and thus ultimately will have a longer and smaller diameter internal primary pipe 66. Gasket 16 is next placed over insert 12 and abutted against the interior side of wall 58. Next washer 18 is inserted over insert 12 with the flat base being positioned against gasket 16. Nut 20 is then inserted over insert 12 engaging threads 46 and 32. Nut 20 is advanced until it abuts the upper rim of sidewall 40 of washer 18, and then nut 20 is tightened with a wrench or other suitable leveraging tool to push washer 18 and gasket 16 toward the wall 58, and to draw flange 28 and gasket 14 toward washer 18 and wall 58 to create fluid tight seals between the now compressed gaskets 14 and 16, wall 58 and flange 28. Since only the tips of the side surfaces 44 of nut 20 engage the narrow rim of washer 18, there are spaces left adjacent the sidewalls 40 of nut 20 and sidewall 40 of washer 18 for passage of air. The neck 50 of small boot 22 is then fitted over the free end of pipe 60. The larger open end 52 of boot 22 is fitted over recessed shoulder 36 of insert 12 and secured with a clamp 25. Neck 50 of boot 22 is then secured tightly to pipe 60 with clamp 25. The neck 50 of the larger boot 24 is then fitted over a free end of the pipe 60. The larger open end 52 of boot 24 is fitted over boot 22, nut 20 and washer 18. Another clamp 25 is then positioned over larger open end 52 of boot 24 directly over side wall 40 of washer 18 and secured in position. A forth clamp 25 is applied to neck 50 of boot 24 so as to secure the neck 50 to the pipe 60. All clamps 25 are tightened sufficiently to prevent fluid leakage. Necks 50 are rubbery in nature and do allow for sliding the boots 22 and 24 along the length of the pipe 60.

With all parts assembled, there is now formed an interior air tight chamber 62. Chamber 62 as herein used includes the passageways previously described. Chamber 62 is defined by the interior surface of boot 24, the interior edges of washer 18 and both gaskets 14 and 16, the interior surface of aperture 56, the exterior of insert 12, the exterior of boot 22 and the exterior of pipe 60 as shown in FIG. 2. Chamber 62 can be pressurized with air, or other suitable gases, using valve 54 and a conventional pressurized air source. It is suggested that chamber 62 is pressurized up to five p.s.i., especially for use in this application in association with underground fuel tanks. Valve 54 is then connected to a gauge which can be checked periodically over a given period of time, such as twenty four to forty eight hours, to determine if the pressure has been maintained within chamber 62. If the pressure test indicates a leak, the tightening of the clamps 25 would be a first step in trying to solve the problem, and if this didn't stop the leaking, then the bulkhead 10 would need to be completely dismantled and inspected for defects or incorrect installation. The free end of pipe 60 may be terminated as desired once the testing of the seals of the bulkhead has been completed to satisfaction.

Chamber 62 is structured to allow passage of air past the openings adjacent side surfaces 44 of nut 20, and past centering guides 42 on washer 18, past the centering guides 38 on gasket 16, past the edge of aperture 56 and finally past centering guides 38 on gasket 14. This allows all the sealed joints to be tested to determine if chamber 62 is air tight. The sealed joints primarily include the various members compressed between nut 20 and flange 28 which generally consists of washer 18, both gaskets 14 and 16, and both sides of wall 58, and then the seals created at all four clamps 25. These sealed joints which are tested are shown in FIG. 2 at number 64. This specific structuring of chamber 62 provides a much more thorough determination of leakage than, for example, if chamber 62 extended only to gasket 16 and the seal was instead created at the outer and interior edges of gasket 16. In such a situation, a leak could conceivably enter from the exterior side of wall 58 around the first gasket 14 and pass around aperture 56 and then flow past the second gasket 16 and into the interior of wall 58 which would not be indicated on the gauge. Therefore, by allowing the pressurized air or gas to extend to the first gasket 14, all sealed joints 64 can be monitored, and therefore any leakage can be detected passing either way through aperture 56.

Figure 4:
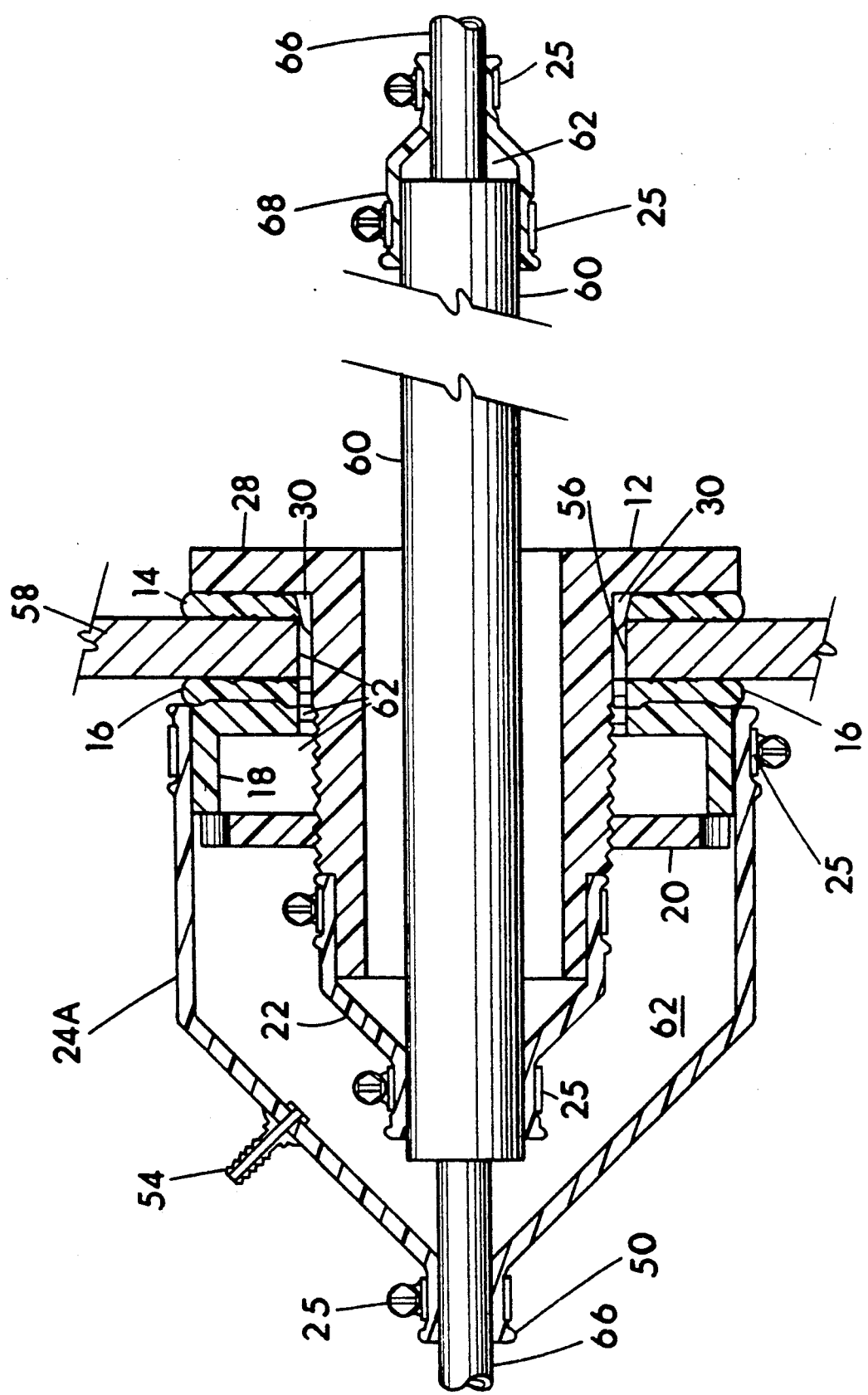
FIG. 4 is a cross sectioned side view of a slightly varied use of essentially the same embodiment of my testable bulkhead shown affixed over a primary and secondary pipe with a second seal affixed over the primary and secondary pipes so as to also allow the pressure testing of the secondary containment pipe.

A slightly different use arrangement of essentially the same embodiment 10 is shown in FIG. 4. This arrangement of FIG. 4 is directed towards a testable bulkhead seal and testing arrangement wherein both the testable bulkhead 10 at wall 58 and the outer secondary pipe 60 containing primary pipe 66 can be tested at the same time. This testing includes the use of a large boot reducer 24A in place of boot 24 described above, and all other components associated with the bulkhead shown in FIG. 4 are the same as those described regarding embodiment 10 above. The difference in boot 24 and 24A is in the diameter of the respective necks 50 wherein the neck 50 of boot 24 is sized for affixment around a larger secondary pipe 60, and the neck 50 of boot 24A is sized for affixment around the smaller primary pipe 66 beyond the terminal end of the secondary pipe 60. Also used in this arrangement is a reducer boot 68 which is essentially a small boot 22 or 24. The small neck of reducer 68 is sized for placement over primary pipe 66 with the larger end of boot 68 sized for placement over secondary pipe 60 whereat both ends are clamped with clamps 25 as shown in FIG. 4. With this system, not only the sealed aperture 56 in wall 58 is tested, but the secondary containment pipe 60 around primary pipe 66 is also tested to determine leakage anywhere in the line. That which is shown in FIG. 4 essentially extends or makes pressure chamber 62 to include the secondary containment pipe 60. Normally, after testing and ascertaining there are no leaks, boot 24A is un-clamped and slid down on pipe 66 to expose the free and open end of secondary pipe 60 so that the pipe 60 may drain any fluid which it may contain in the future. Boot 24A may be left in its disconnected mode on pipe 66 to allow its re-connection and re-testing of the system at some future time if desired. Normally, pipe 66 would be connected to equipment, and not have a free end, and this is why one might wish to leave boot 24A in its disconnected mode on pipe 66. After testing and determining there are no leaks in the system, boot 68 could be left in place or removed depending on the particular connections being made at that end of the pipes 60 and 66.

Although I have very specifically described the preferred structures of the invention, it should be understood that the specific details are just that, "preferred" structures given for example to those skilled in the art. Many minor changes in the specific structures described may clearly be made without departing from the scope of the invention, and therefore it should be understood that the scope of the invention is not to be overly limited by the specification and drawings given for example, but is to be determined by the spirit and scope of the appended claims. I anticipate many structural arrangements which are different but functionally equivalent to the preferred embodiment herein described, and therefore these structurally different but functionally equivalent arrangements are considered to fall within the true scope of my invention as detailed in principle in this disclosure.

What I claim as my invention is:

1. A sealing testable bulkhead for prevention of leakage around an elongated member penetrating a wall, comprising;

an insert means for placement into a hole in a wall, said insert means having a opening therethrough for passage of an elongated member through said insert means and the wall, said insert means having a flange means for preventing the complete passage of said insert means through the hole in the wall and for abutting against a first sealing gasket sized for placement over said insert means between said flange means and the wall for sealing between said flange means and the wall, a second sealing gasket sized for placement over said insert means and sealingly against the wall on the opposite side of the wall from said first sealing gasket, a washer means sized for placement over said insert means and sealed abutment against said second sealing gasket, securing means engagable between said insert means said washer means for applying pressure to said washer means so as to push said washer means toward the wall and to draw said flange means toward said washer means and thereby apply pressure to said first and second sealing gaskets to aid in defining fluid tight seals, a first reducer means; said first reducer means being a hollow member having a first and a second open end oppositely disposed from one another, said first open end sized for placement over and sealed affixment to an elongated member passing through said insert means, said second open end sized for placement over and sealed affixment to said insert means adjacent said securing means;

a second reducer means larger than said first reducer means; said second reducer means being a hollow member having a first and a second open end oppositely disposed from one another with said first open end sized for placement over and sealed affixment to an elongated member passing through said insert means, said second open end sized for placement over and sealed affixment to said washer means so as to encase said first reducer means, valve means affixed to and through an exterior wall of said second reducer means for in-putting pressurized air into an interior chamber defined at least in part by said second reducer means, air conducting means for communicating air within said main chamber to each sealed area so as to allow testing for leaks in the sealing testable bulkhead.

2. A sealing testable bulkhead for prevention of leakage around an elongated member penetrating a wall, comprising;

an insert for placement into a hole in the wall, said insert comprising a barrel having a bore with a first and a second open end sized to allow for passage of an elongated member through said insert, said insert adjacent said first open end having an flange extending perpendicular outward beyond said barrel, an exterior portion of said barrel adjacent said second open end being un-threaded, an exterior portion of said barrel between said un-threaded portion and said flange having threads, a first sealing gasket sized for placement over said barrel and against said flange, said first sealing gasket when in use being between said flange and a first side of the wall with said barrel positioned within the hole in the wall, a second sealing gasket sized for placement over said barrel, said second sealing gasket when in use being against a second side of the wall opposite the first said of the wall, a wide-lipped washer sized for placement over said barrel and abutment with a first side of said washer against said second sealing gasket on an opposite side of said second sealing gasket from the wall, a nut sized for placement over said barrel and abutment against a second side of said washer, said nut having threads engagable with said threads on said barrel so as to allow for compressing both of the gaskets for sealing purposes, a resilient first reducer; said first reducer being a hollow member having two open ends oppositely disposed from one another, a first of said open ends being substantially smaller than a second and larger of said open ends, the smaller open end sized for placement over and sealed affixment to an elongated member passing through said insert, the larger of said open ends sized for placement over and sealed affixment to the exterior un-threaded portion of said barrel, a resilient second reducer larger than said first reducer; said second reducer being a hollow member having two open ends oppositely disposed from one another, a first of said open ends being substantially smaller than a second and larger of said open ends, the smaller open end sized for placement over and sealed affixment to an elongated member passing through said insert, the larger of said open ends sized for placement over and sealed affixment to the wide-lipped portion of said washer so as to encase said first reducer, an input valve affixed to and through an exterior wall of said second reducer for in-putting pressurized air into an interior chamber defined at least in part by said second reducer, air conducting means for communicating air within said main chamber to each sealed area so as to allow testing for leaks in the sealing testable bulkhead.

3. A sealing testable bulkhead for prevention of leakage around an elongated member penetrating a wall, comprising;

a male insert for placement into a hole in the wall, said insert comprising a cylindrical barrel having a central bore with a first and a second open end sized to allow for passage of an elongated member through said insert, said insert adjacent said first open end having an flange extending perpendicular outward beyond said barrel, an exterior portion of said barrel adjacent said second open end being un-threaded, an exterior portion of said barrel between said un-threaded portion and said flange having threads, a first sealing gasket sized for placement over said barrel and against said flange, said first sealing gasket when in use being between said flange and a first side of the wall with said barrel positioned within the hole in the wall, a second sealing gasket sized for placement over said barrel, said second sealing gasket when in use being against a second side of the wall opposite the first said of the wall, a wide-lipped washer sized for placement over said barrel and abutment with a first side of said washer against said second sealing gasket on an opposite side of said second sealing gasket from the wall, a nut sized for placement over said barrel and abutment against a second side of said washer, said nut having threads engagable with said threads on said barrel so as to allow for compressing both of the gaskets for sealing purposes, a resilient first reducer; said first reducer being a hollow cylinder having two open ends oppositely disposed from one another, a first of said open ends being substantially smaller than a second and larger of said open ends, the smaller open end sized for placement over and sealed affixment to an elongated member passing through said insert, the larger of said open ends sized for placement over and sealed affixment to the exterior un-threaded portion of said barrel, a resilient second reducer larger than said first reducer; said second reducer being a hollow cylinder having two open ends oppositely disposed from one another, a first of said open ends being substantially smaller than a second and larger of said open ends, the smaller open end sized for placement over and sealed affixment to an elongated member passing through said insert, the larger of said open ends sized for placement over and sealed affixment to the wide-lipped portion of said washer so as to encase said first reducer, an input valve affixed to and through an exterior wall of said second reducer for in-putting pressurized air into an interior chamber defined at least in part by said second reducer, air conducting means for communicating air within said main chamber to each sealed area so as to allow testing for leaks in the sealing testable bulkhead.

* * * * *